(12) United States Patent
Tsujimoto et al.

(10) Patent No.: US 10,654,441 B2
(45) Date of Patent: May 19, 2020

(54) BUCKLE DEVICE

(71) Applicant: KABUSHIKI KAISHA TOKAI-RIKA-DENKI-SEISAKUSHO, Aichi-ken (JP)

(72) Inventors: Masafumi Tsujimoto, Aichi-ken (JP); Taku Sasaguchi, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 198 days.

(21) Appl. No.: 15/678,274

(22) Filed: Aug. 16, 2017

(65) Prior Publication Data

US 2018/0056931 A1 Mar. 1, 2018

(30) Foreign Application Priority Data

Aug. 29, 2016 (JP) .................................. 2016-167090

(51) Int. Cl.
| | | |
|---|---|---|
| B60R 22/20 | (2006.01) | |
| B60R 22/26 | (2006.01) | |
| B60R 22/48 | (2006.01) | |
| B60R 22/18 | (2006.01) | |

(52) U.S. Cl.
CPC ............ B60R 22/20 (2013.01); B60R 22/201 (2013.01); B60R 22/26 (2013.01); B60R 22/48 (2013.01); *B60R 2022/1806* (2013.01)

(58) Field of Classification Search
CPC ................................ B60R 22/20; B60R 22/18
See application file for complete search history.

(56) References Cited

U.S. PATENT DOCUMENTS

| 3,833,781 A | * | 9/1974 | Rumpf | ................... B60R 22/48 200/61.58 B |
| 4,163,128 A | * | 7/1979 | Miskowicz | ............. B60R 22/48 200/61.58 B |
| 4,785,906 A | * | 11/1988 | Kang | ...................... B60R 22/48 180/270 |
| 5,181,773 A | * | 1/1993 | Colvin | ............... A44B 11/2565 280/801.1 |

(Continued)

FOREIGN PATENT DOCUMENTS

| DE | 102011112049 A1 * | 3/2013 | ............. B60R 22/22 |
| DE | 102014110955 B4 * | 1/2018 | |

(Continued)

OTHER PUBLICATIONS

Office Action issued in the corresponding Japanese Patent Application No. 2016-167090 dated Nov. 21, 2017.

*Primary Examiner* — Nicole T Verley
(74) *Attorney, Agent, or Firm* — Roberts Calderon Safran & Cole P.C.

(57) ABSTRACT

A buckle device including: a buckle that is configured to engage with a tongue of a seatbelt device, a cover member that includes a first member and a second member for assembly together, and at which the buckle is provided; an elongated member that is anchored to the first member at a length direction leading end portion of the elongated member, and a retention section that is provided at the first member, and that is configured to engage a portion of the elongated member that is further toward a length direction base end side of the elongated member than the length direction leading end portion.

7 Claims, 9 Drawing Sheets

(56) References Cited

U.S. PATENT DOCUMENTS

| | | | | |
|---|---|---|---|---|
| 6,647,811 B2* | 11/2003 | Blakesley | ............... | B60R 22/18 73/862.391 |
| 6,729,194 B2* | 5/2004 | Kaijala | ................... | B60R 22/18 73/811 |
| 6,776,056 B2* | 8/2004 | Garver | .................... | B60R 22/18 73/862 |
| 7,086,297 B2* | 8/2006 | Blakesley | ............... | B60R 22/18 73/862.474 |
| 7,513,530 B2* | 4/2009 | Gomi | ..................... | B60R 22/18 180/268 |
| 7,914,045 B2* | 3/2011 | Messner | ................. | B60R 22/12 280/801.1 |
| 9,505,377 B2* | 11/2016 | Biegun | ..................... | A63G 7/00 |
| 9,849,859 B2* | 12/2017 | Hayashi | ............. | A44B 11/2561 |
| 9,896,059 B2* | 2/2018 | Fujii | ................... | A44B 11/2565 |
| 10,028,554 B2* | 7/2018 | Haas | ..................... | A44B 11/2515 |
| 10,179,562 B2* | 1/2019 | Hayashi | ................... | B60R 22/20 |
| 2002/0180200 A1* | 12/2002 | Tokugawa | .............. | B60R 22/48 280/801.1 |
| 2017/0021796 A1* | 1/2017 | Hayashi | ............. | A44B 11/2561 |
| 2017/0225646 A1* | 8/2017 | Klaassen | ................. | B60R 22/03 |
| 2017/0232928 A1* | 8/2017 | Tatsuma | .................. | B60R 22/22 280/801.2 |
| 2017/0334391 A1* | 11/2017 | Fujii | ................... | A44B 11/2503 |

FOREIGN PATENT DOCUMENTS

| | | | | |
|---|---|---|---|---|
| JP | S5055027 A1 | 5/1975 | | |
| JP | H07251706 A | 10/1995 | | |
| JP | 2010-208497 A1 | 9/2010 | | |
| WO | WO-2004002784 A1 * | 1/2004 | ............. | B60R 22/18 |
| WO | WO-2011053015 A2 * | 5/2011 | ........ | A44B 11/2569 |
| WO | WO-2018025969 A1 * | 2/2018 | ............... | H01H 1/44 |

* cited by examiner

BUCKLE DEVICE

CROSS-REFERENCE TO RELATED APPLICATION

This application is based on and claims priority under 35 USC 119 from Japanese Patent Application, No. 2016-167090 filed on Aug. 29, 2016, the disclosure of which is incorporated by reference herein.

BACKGROUND

Technical Field

The present disclosure relates to a buckle device of a seatbelt device.

Related Art

The buckle device of Japanese Patent Application Laid-Open (JP-A) No. 2010-208497 is provided with an elongated member such as a cord electrically connecting a buckle switch and a control device. A length direction leading end portion of the elongated member is anchored to a buckle cover or the like of the buckle device. In buckle devices configured in this manner, the position of a length direction leading end side portion of the elongated member is not stabilized during assembly of the buckle device in configurations in which the length direction leading end portion of the elongated member is simply anchored to a buckle cover or the like.

SUMMARY

In consideration of the above circumstances, the present disclosure provides a buckle device capable of stabilizing the position of a length direction leading end side portion of an elongated member.

A buckle device of a first aspect includes a buckle that is configured to engage with a tongue of a seatbelt device, a cover member that includes a first member and a second member for assembly together, and at which the buckle is provided, an elongated member that is anchored to the first member at a length direction leading end portion of the elongated member, and a retention section that is provided at the first member, and that is configured to engage a portion of the elongated member that is further toward a length direction base end side of the elongated member than the length direction leading end portion.

According to the buckle device of the first aspect, the buckle is provided at the cover member, and the cover member includes the first member and the second member for assembly together. The length direction leading end portion of the elongated member is anchored to the first member configuring the cover member, and the first member is provided with the retention section. The retention section engages the portion of the elongated member further toward the length direction base end side of the elongated member than the length direction leading end portion. Accordingly, during assembly of the buckle device, for example, the position of the length direction leading end side portion of the elongated member is stabilized when assembling the first member and the second member together. The buckle device is thus easy to assemble.

A buckle device of a second aspect is the buckle device of the first aspect, wherein, in a case of retaining the elongated member, the retention section is configured to be elastically deformed, an elastic deformation of the retention section being suppressed by the second member in a state in which the first member and the second member are assembled together.

According to the buckle device of the second aspect, the retention section is configured to be elastically deformed in case of retaining the elongated member. Moreover, elastic deformation of the retention section is suppressed by the second member in a state in which the first member and the second member are assembled together. This thereby enables a loss of retention of the elongated member by the retention section to be suppressed, and enables retention of the elongated member by the retention section to be maintained.

A buckle device of a third aspect is the buckle device of the first aspect, wherein the length direction base end side of the elongated member is configured to extend from a first member side to a second member side, and the retention section is provided at an end portion on the second member side of the first member in a state in which the first member and the second member are assembled together.

According to the buckle device of the third aspect, the length direction base end side of the elongated member is configured to extend from the first member side to the second member side. Note that the retention section is provided to the end portion of the first member on the second member side in a state in which the first member and the second member are assembled together. This thereby enables a portion of the elongated member disposed on the first member side to be stabilized.

A buckle device of a fourth aspect includes a buckle that is configured to engage with a tongue of a seatbelt device, a moving member at which the buckle is provided, a guide member to which the moving member is movably assembled such that the moving member is guided, an elongated member that is anchored to the moving member at a length direction leading end portion of the elongated member, and a retention section that is provided at the moving member, and that is configured to retain a portion of the elongated member that is further toward a length direction base end side of the elongated member than the length direction leading end portion.

According to the buckle device of the fourth aspect, the length direction leading end portion of the elongated member is anchored to the moving member that is movably assembled to the guide member, and the buckle device is provided with the retention section. The portion of the elongated member further toward the length direction base end side of the elongated member than the length direction leading end portion is retained by the retention section. The position of a length direction leading end side portion of the elongated member is thereby stabilized during assembly of the buckle device. The buckle device is accordingly easy to assemble.

A buckle device of a fifth aspect is the buckle device of the fourth aspect, wherein the moving member is configured to be movable toward a length direction leading end side of the guide member and toward a length direction base end side of the guide member, and the retention section is provided along a length direction leading end portion of the guide member further to a length direction leading end side of the guide member than the guide member in a state in which it is assumed that the moving member is moved toward the length direction base end side of the guide member.

According to the buckle device of the fifth aspect, the moving member is configured to be movable toward the length direction leading end side of the guide member and toward the length direction base end side of the guide member. Note that the retention section is provided along the length direction leading end portion of the guide member further to the length direction leading end side of the guide member than the guide member in a state assuming that the moving member is moved toward the length direction base end side of the guide member. This thereby enables the portion of the elongated member retained by the retention section to be prevented or suppressed from abutting a length direction leading end portion of the guide member in a state assuming that the moving member is moved to the length direction base end side of the guide member.

A buckle device of a sixth aspect is the buckle device of the first aspect, wherein the retention section includes a first retention portion that is configured to be engaged with the elongated member from one side in a direction intersecting a length direction of the elongated member and to suppress displacement of the elongated member toward the one side, and a second retention portion that is offset toward a length direction side of the elongated member with respect to the first retention portion, and that is configured to be engaged with the elongated member from another side in the direction intersecting the length direction of the elongated member and to suppress displacement of the elongated member toward the other side.

According to the buckle device of the sixth aspect, the first retention portion of the retention section is configured to be engaged with the elongated member from the one side in a direction intersecting the length direction of the elongated member, and the second retention portion of the retention section is configured to be engaged with the elongated member from the another side in the direction intersecting the length direction of the elongated member. The portion of the elongated member retained by the retention section is thus suppressed from being displaced toward both the one side and the another side in the direction intersecting the length direction of the elongated member.

Moreover, the second retention portion is provided offset with respect to the first retention portion toward a length direction side of the elongated member. A range in which displacement of the elongated member is suppressed by the first retention portion and the second retention portion can accordingly be made large.

A buckle device of a seventh aspect is the buckle device of the first aspect, wherein the retention section includes, a first retention portion that is configured to be engaged with the elongated member from one side in a direction intersecting a length direction of the elongated member and to suppress displacement of the elongated member toward the one side, a second retention portion that is configured to be engaged with the elongated member from another side in the direction intersecting the length direction of the elongated member and to suppress displacement of the elongated member toward the other side, a first removal-suppression portion that is configured to extend from the first retention portion toward the other side in the direction intersecting the length direction of the elongated member and to suppress displacement of the elongated member in a direction in which the elongated member comes out from a gap between the first retention portion and the second retention portion, and a second removal-suppression portion that is configured to extend from the second retention portion toward the one side in the direction intersecting the length direction of the elongated member further to a length direction side of the elongated member than the first removal-suppression portion and to suppress displacement of the elongated member in the direction in which the elongated member comes out from the gap between the first retention portion and the second retention portion.

According to the buckle device of the seventh aspect, the first retention portion of the retention section is configured to be engaged with the elongated member from the one side in the direction intersecting the length direction of the elongated member, and the second retention portion of the retention section is configured to be engaged with the elongated member from the another side in the direction intersecting the length direction of the elongated member. The portion of the elongated member retained by the retention section is thereby suppressed from being displaced toward both the one side and the another side in the direction intersecting the length direction of the elongated member.

Moreover, the first removal-suppression portion is configured to extend from the first retention portion toward the another side in the direction intersecting the length direction of the elongated member. The second removal-suppression portion is configured to extend from the second retention portion toward the one side in the direction intersecting the length direction of the elongated member. Displacement of the elongated member disposed between the first retention portion and the second retention portion in a direction to come out from a gap between the first retention portion and the second retention portion is thereby suppressed by the first removal-suppression portion and the second removal-suppression portion.

Note that the second removal-suppression portion is provided further to a length direction side of the elongated member than the first removal-suppression portion. This thereby enables the first removal-suppression portion to be greatly extended toward the side of the second retention portion, or enables the second removal-suppression portion to be extended toward the side of the first retention portion.

According to a buckle device of an eighth aspect is the buckle device of the seventh aspect, wherein in a state in which the first member and the second member have been assembled together, an end portion of the second member on one length direction side of the cover member is disposed at another side of the second retention portion in a thickness direction of the cover member. Accordingly, the second retention portion is deformed so as to swing toward the one side in the thickness direction of the cover member about a portion of the second retention portion on the end portion at the one length direction side of the cover member. A separation between one width direction end of the first removal-suppression portion and the another width direction end of the second removal-suppression portion on one width direction side of the first member, and a separation between the another width direction end of the first removal-suppression portion and the one width direction end of the second removal-suppression portion on the another width direction of the first member, are accordingly made smaller. Displacement of the elongated member toward the thickness direction side of the cover member is thereby suppressed by the first retention portion and the second retention portion.

As described above, the buckle device according to the present disclosure is capable of stabilizing a length direction leading end side portion of the elongated member.

BRIEF DESCRIPTION OF THE DRAWINGS

Exemplary embodiments of the present disclosure will be described in detail based on the following figures, wherein.

DESCRIPTION OF EMBODIMENTS

Explanation follows regarding an exemplary embodiment of the present disclosure, with reference to FIG. 1 to FIG. 9. Note that in each of the drawings, the arrow FR indicates a vehicle front side, the arrow OUT indicates a vehicle width direction outside, and the arrow UP indicates a vehicle upper side for a vehicle applied with a buckle device 10. Moreover, in each of the drawings, the arrow A indicates one length direction side of an outside cover 34 and an inside cover 54 configuring the buckle device 10, and the arrow B indicates another length direction side of the outside cover 34 and the inside cover 54. Further, in each of the drawings, the arrow C indicates one width direction side of the outside cover 34 and the inside cover 54, and the arrow D indicates another width direction side of the outside cover 34 and the inside cover 54. Moreover, in each of the drawings, the arrow E indicates one thickness direction side of the outside cover 34 and the inside cover 54, and the arrow F indicates another thickness direction side of the outside cover 34 and the inside cover 54.

Figure 1:
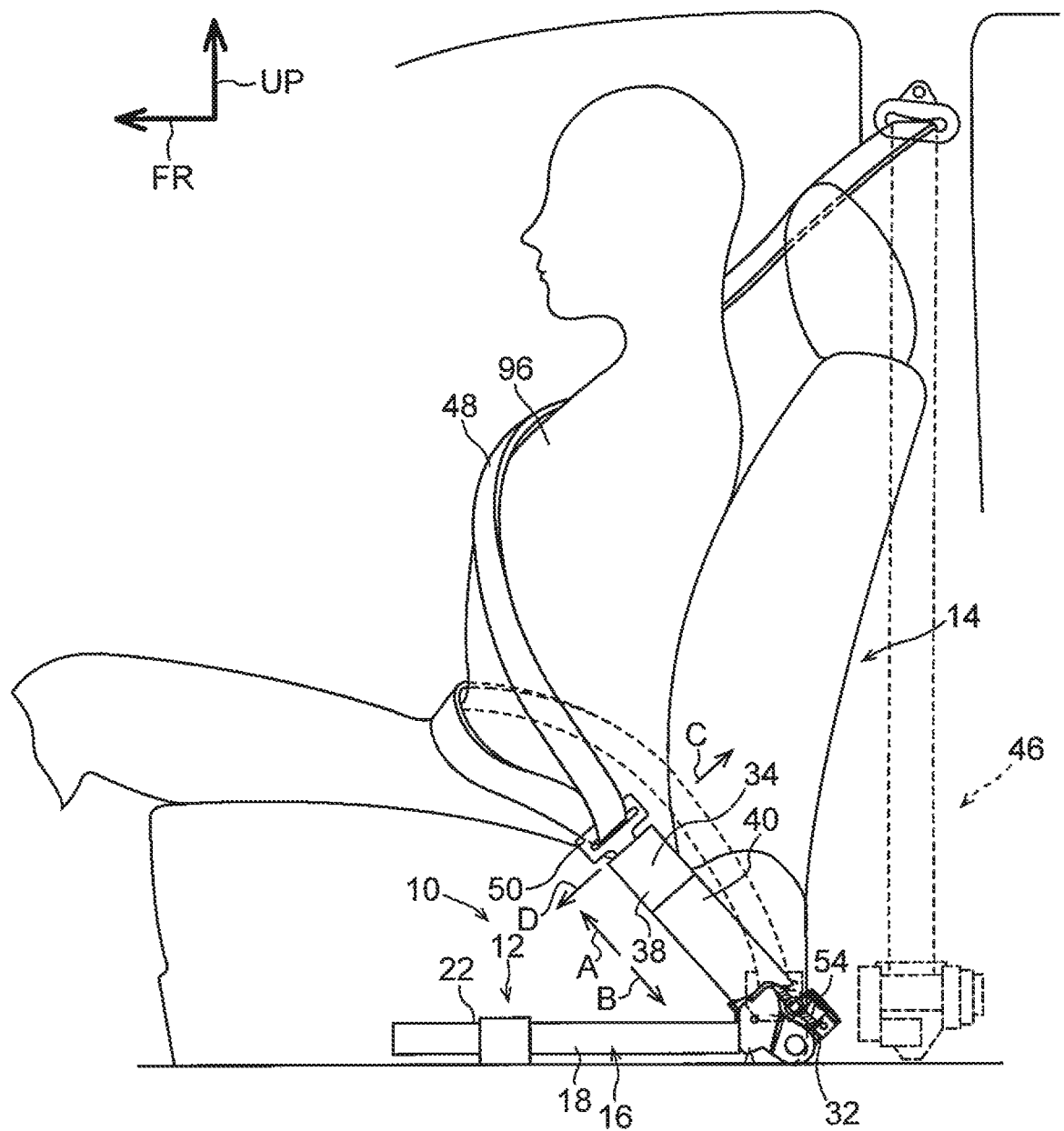
FIG. 1 is a side view of a seat applied with a buckle device according to an exemplary embodiment of the present disclosure, as viewed from a vehicle width direction inside.
Figure 2:
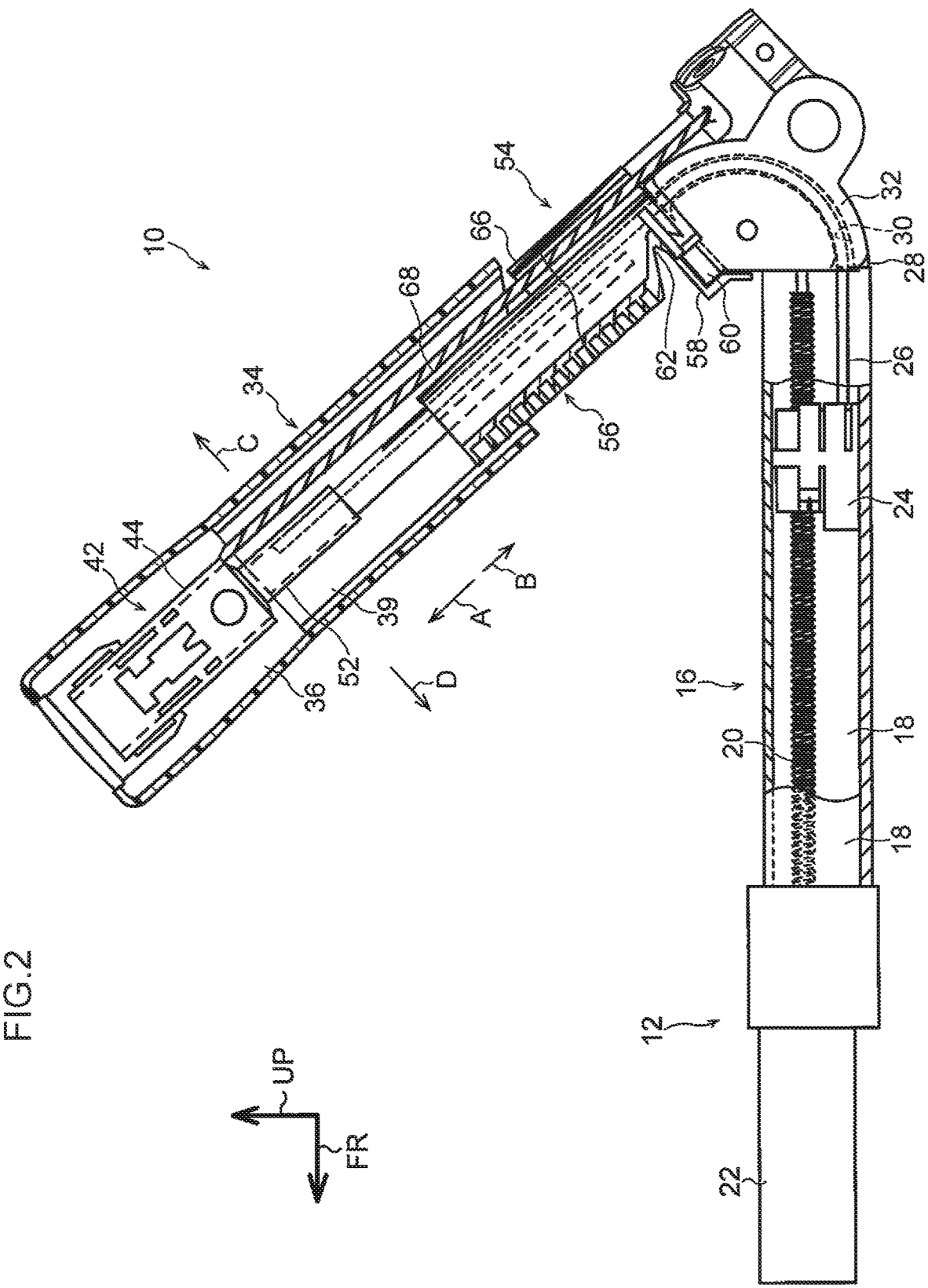
FIG. 2 is a side view cross-section of a buckle device according to an exemplary embodiment of the present disclosure, illustrating a state in which an outside cover has moved diagonally toward a vehicle front upper side.

As illustrated in FIG. 1 and FIG. 2, the buckle device 10 includes a buckle drive device 12, serving as a drive unit. The buckle drive device 12 is provided at a vehicle width direction inside of a seat 14 applied with the buckle device 10. The buckle drive device 12 includes a frame 16, serving as a slider guide mechanism. The frame 16 is fixed to a vehicle body side, for example a floor section of the vehicle body of a vehicle, using fastenings such as bolts. As illustrated in FIG. 2, the frame 16 includes a pair of guide walls 18, serving as slide guide sections, facing each other along the vehicle width direction. A drive screw 20, serving as a drive section, is provided between the two guide walls 18. A center axis direction of the drive screw 20 runs along the vehicle front-rear direction, and the drive screw 20 is capable of rotating about its axial center.

As illustrated in FIG. 1 and FIG. 2, a motor actuator 22, serving as a drive force output unit, is provided at a vehicle front side of the frame 16. A vehicle front side end portion of the drive screw 20 is coupled to the motor actuator 22, and the drive screw 20 is rotated about the axial center of the drive screw 20 by drive force output from a motor of the motor actuator 22. The motor of the motor actuator 22 is electrically connected to a control unit such as a motor driver or an ECU (not illustrated in the drawings), and the motor of the motor actuator 22 is controlled by the control unit.

As illustrated in FIG. 2, a slider 24 is provided between the two guide walls 18 of the frame 16. The two vehicle width direction side faces of the slider 24 abut the respective guide walls 18 of the frame 16. Moreover, a threaded hole through which the drive screw 20 passes is formed through the slider 24. The slider 24 is guided by the two guide walls 18 so as to be slid in the vehicle front-rear direction by rotating the drive screw 20.

As illustrated in FIG. 2, the buckle device 10 further includes a wire rope 26, serving as a coupling member. The wire rope 26 is formed in an elongated shape. As illustrated in FIG. 2, at a portion of the wire rope 26 on a length direction base end side of a length direction intermediate portion of the wire rope 26, the length direction of the wire rope 26 runs along the vehicle front-rear direction. The length direction base end portion of the wire rope 26 is also coupled to the slider 24, further to the vehicle lower side than the drive screw 20. Accordingly, when the slider 24 slides in the vehicle front-rear direction, the wire rope 26 is moved along the length direction of the wire rope 26.

Moreover, as illustrated in FIG. 2, a wire guide 28 is provided at a vehicle rear side of the frame 16. The wire guide 28 is formed with a wire guide groove 30. The wire guide groove 30 is open at the vehicle width direction inside face of the wire guide 28. A cover plate 32 is provided at a vehicle width direction inside of the wire guide 28, and the wire guide groove 30 of the wire guide 28 is closed off from the vehicle width direction inside by the cover plate 32.

One length direction end of the wire guide groove 30 is open at a vehicle front side face of the wire guide 28, and a length direction intermediate portion of the wire guide groove 30 is curved about an axis having an axial direction running along the vehicle width direction. Another length direction end of the wire guide groove 30 is open at a vehicle upper side face of the wire guide 28. The wire rope 26 passes through the wire guide groove 30, and the wire rope 26 bends around an axis having an axial direction along the vehicle width direction (width direction of the seat 14) so as to follow the wire guide groove 30 of the wire guide 28. Moreover, a length direction leading end side of the wire rope 26 extends diagonally toward the vehicle front upper side (arrow A direction in FIG. 2) from an opening in the vehicle upper side face of the wire guide 28.

As illustrated in FIG. 1 and FIG. 2, the buckle device 10 includes the outside cover 34, serving as a moving member and as a cover member. A cover length direction, this being the length direction of the outside cover 34 (the arrow A direction and the arrow B direction in FIG. 1, etc.) is a direction inclined toward the vehicle front-rear direction with respect to the vehicle up-down direction. The outside cover 34 is configured in a tube shape with both cover length direction end portions of the outside cover 34 open. Moreover, a cross-section profile of the outside cover 34 as taken in a direction orthogonal to the cover length direction of the outside cover 34 is substantially rectangular in shape, with the thickness direction of the outside cover 34 running substantially along the vehicle width direction.

The outside cover 34 includes a first member 36. A second member 38 is disposed on another cover length direction side of the first member 36 (the arrow B direction side in FIG. 2). Moreover, a third member 39 is disposed on one cover thickness direction side of the first member 36 (the vehicle width direction inside of the first member 36). Furthermore, a fourth member 40 is disposed on the another cover length direction side of the third member 39 and on the one cover thickness direction side of the second member 38 (the vehicle width direction inside of the second member 38). The outside cover 34 is formed by assembling the first member 36, the second member 38, the third member 39, and the fourth member 40 together.

A buckle 42 is provided at a vehicle upper side portion within the outside cover 34. The buckle 42 includes a buckle body 44. The buckle body 44 is formed from a metal plate member, such as steel, and has a U-shaped cross-section profile opening toward the vehicle width direction inside. The buckle body 44 is disposed in the outside cover 34 between the first member 36 and the third member 39, and is retained by the outside cover 34. A configuration component of the buckle 42, such as a latch (not illustrated in the drawings), is provided inside the buckle body 44. A tongue 50 provided to webbing 48 of a seatbelt device 46 is inserted inside the buckle body 44 diagonally from a vehicle upper front side of the buckle body 44. When this is performed, the latch provided to the buckle body 44 enters a hole formed in the tongue 50 such that the tongue 50 is engaged by the buckle 42.

An end portion of the buckle body 44 on the another cover length direction side (the arrow B direction side in FIG. 2) is formed with a joint anchor 52. The joint anchor 52 is integrally formed to the buckle body 44 using a metal plate material, and a leading end side (the arrow B direction side in FIG. 2) portion of the joint anchor 52 enters between the second member 38 and the fourth member 40 of the outside cover 34. A length direction leading end portion of the wire rope 26 is anchored to the joint anchor 52.

As illustrated in FIG. 2, the buckle device 10 includes the inside cover 54, serving as a guide member. The inside cover 54 is formed from a synthetic resin material that is more flexible than the outside cover 34. The inside cover 54 includes an inside cover body 56. The length direction of the inside cover 54 runs along the cover length direction (the arrow A direction and arrow B direction in FIG. 2, etc.). The inside cover body 56 is formed in a tube shape, and the inside cover 54 is open at both cover length direction ends.

The cross-section profile of the inside cover body 56 of the inside cover 54 as taken along a direction orthogonal to the length direction of the inside cover 54 is substantially rectangular shaped, and a thickness direction of the inside cover body 56 runs substantially along the vehicle width direction. The inside cover body 56 is inserted inside the outside cover 34 through the another cover length direction end of the outside cover 34. Moreover, the inside cover body 56 is disposed at the vehicle upper side of the wire guide 28, and an end portion at the another cover length direction side (the arrow B direction side in FIG. 2) of the inside cover body 56 opposes the vehicle upper side face of the wire guide 28.

A cover-side coupling portion 58 is formed at the end portion at the another cover length direction side (the arrow B direction side in FIG. 2) of the inside cover body 56. The cover-side coupling portion 58 of the inside cover body 56 is formed with a tube shape that penetrates through along the vehicle width direction. The cover-side coupling portion 58 of the inside cover body 56 has a substantially rectangular cross-section profile. The cover plate 32 described above is disposed at the vehicle width direction inside of the cover-side coupling portion 58 of the inside cover body 56. The cover plate 32 is formed with a retention claw 60. The retention claw 60 extends from the cover plate 32 toward the vehicle width direction outside, and enters inside the cover-side coupling portion 58 through a vehicle width direction inside end of the cover-side coupling portion 58 of the inside cover body 56.

In conjunction therewith, a portion of the frame 16 described above is disposed at the vehicle width direction outside of the cover-side coupling portion 58 of the inside cover body 56 of the inside cover 54. A vehicle width direction inside face of this portion of the frame 16 opposes a vehicle width direction outside end of the cover-side coupling portion 58 of the inside cover body 56. Should the cover-side coupling portion 58 of the inside cover body 56 attempt to move toward the vehicle width direction outside, the vehicle width direction outside end of the cover-side coupling portion 58 is abutted by the portion of the frame 16. The cover-side coupling portion 58 of the inside cover body 56 is accordingly suppressed from moving toward the vehicle width direction outside. This thereby enables retention the claw 60 of the cover plate 32 to be suppressed from coming out of the cover-side coupling portion 58 of the inside cover body 56, and enables the inside cover body 56 to be retained in the vicinity of an end portion at the another cover length direction side (the arrow B direction side in FIG. 2) of the inside cover 54 by the retention claw 60 of the cover plate 32.

Moreover, a curve inducement portion 62 is formed to the inside cover body 56 of the inside cover 54, further to the vehicle upper side than the cover-side coupling portion 58. The inside cover body 56 has a shorter cover width direction (the arrow C direction and the arrow D direction in FIG. 2) dimension at the curve inducement portion 62 than at portions of the inside cover body 56 other than the curve inducement portion 62. At the curve inducement portion 62, a wall portion on another cover width direction side (the arrow D direction side in FIG. 2) of the inside cover body 56 curves so as to bulge toward the vehicle rear side (more specifically, diagonally toward the vehicle upper rear side). Moreover, at the curve inducement portion 62, wall portions on the two cover thickness direction sides of the inside cover body 56 of the inside cover 54 are notched so as to follow the curve of the another cover width direction side wall portion of the inside cover body 56.

The inside of the curve inducement portion 62 is accordingly open diagonally toward a vehicle front lower side. When load from the another cover width direction side (the arrow D direction side in FIG. 2) of the inside cover body 56 of the inside cover 54 is applied to a portion of the inside cover body 56 of the inside cover 54 further toward one cover length direction side (the arrow A direction side in FIG. 2) than the curve inducement portion 62, bending deformation is induced mainly at the curve inducement portion 62 of the inside cover body 56 of the inside cover 54, and deformation is suppressed at portions of the inside cover body 56 of the inside cover 54 other than the curve inducement portion 62.

Moreover, the wire rope 26 passes through the inside of the inside cover body 56 of the inside cover 54. The length direction leading end side of the wire rope 26 extends from an end portion at the one cover length direction side (the arrow A direction side in FIG. 2) of the inside cover body 56 to the outside of the inside cover body 56, and is coupled to the joint anchor 52. Accordingly, when the wire rope 26 is moved toward its length direction leading end side, the length direction leading end portion of the wire rope 26 is moved diagonally toward the vehicle front upper side (the arrow A direction side in FIG. 2), such that the buckle 42 moves together with the outside cover 34 diagonally toward the vehicle front upper side (the state illustrated in FIG. 2). On the other hand, when the wire rope 26 is moved toward its length direction base end side, the length direction leading end portion of the wire rope 26 is moved diagonally toward the vehicle rear lower side (the arrow B direction side in FIG. 2), such that the buckle 42 is moved together with the outside cover 34 diagonally toward the vehicle rear lower side (the state illustrated in FIG. 1).

As illustrated in FIG. 2, a pair of outside walls 66 are provided to a portion of the inside cover body 56 further to the another cover length direction side (the arrow B direction side in FIG. 2) than a cover length direction intermediate portion of the inside cover body 56. The outside walls 66 extend from the two cover thickness direction ends of the inside cover body 56 toward one cover width direction side of the inside cover body 56 at the one cover width direction side (the arrow C direction side in FIG. 2) end of the inside cover body 56.

Figure 7:
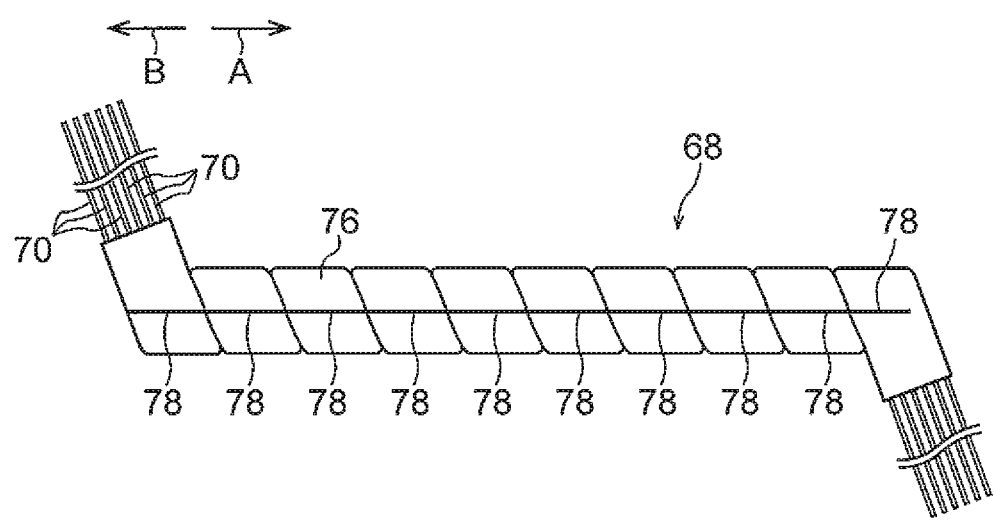
FIG. 7 is a bottom view of a curled cord illustrating markings on the curled cord.

A curled cord 68, serving as an electrical connection member, is provided between the two outside walls 66. As illustrated in FIG. 7, the curled cord 68 includes six elongated members 70. The elongated members 70 contain electrical wires. The electrical wires of the elongated members 70 are formed in elongated thread shapes of a conductive member, such as metal. The electrical wires of the elongated members 70 are covered by an insulating material such as a synthetic resin. Length direction base end portions of the electrical wires of the elongated members 70 are directly or indirectly connected to the ECU, serving as a control unit, or to a vehicle-installed battery, serving as a power source.

The elongated members 70 are covered by a covering 76 in a state in which the elongated members 70 are arranged side-by-side in a direction orthogonal to their length direction. The covering 76 is formed from an insulating material such as a synthetic resin. The curled cord 68 is configured overall as a thin strip shape by covering the plural elongated members 70 with the covering 76. Moreover, the curled cord 68 is configured in a spiral shape having its center axis on one thickness direction side of the covering 76. The curled cord 68 is capable of extending and contracting along the center axis direction of the spiral.

Moreover, the covering 76 of the curled cord 68 is applied with markings 78 as a way of checking. Each marking 78 is linear in shape, and the length direction of the markings 78 runs along the center axis direction of the spiral of the curled cord 68. Moreover, the markings 78 are applied such that adjacent markings 78 line up in a linear shape along the center axis direction of the spiral of the curled cord 68 in a state in which the curled cord 68 is not being applied with an external force, for example a pulling force to pull the curled cord 68 along the center axis direction of the spiral of the curled cord 68, a compressing force to compress the curled cord 68 along the center axis direction of the spiral of the curled cord 68, or a twisting force to twist the curled cord 68 about the center axis direction of the spiral of the curled cord 68.

Figure 8:
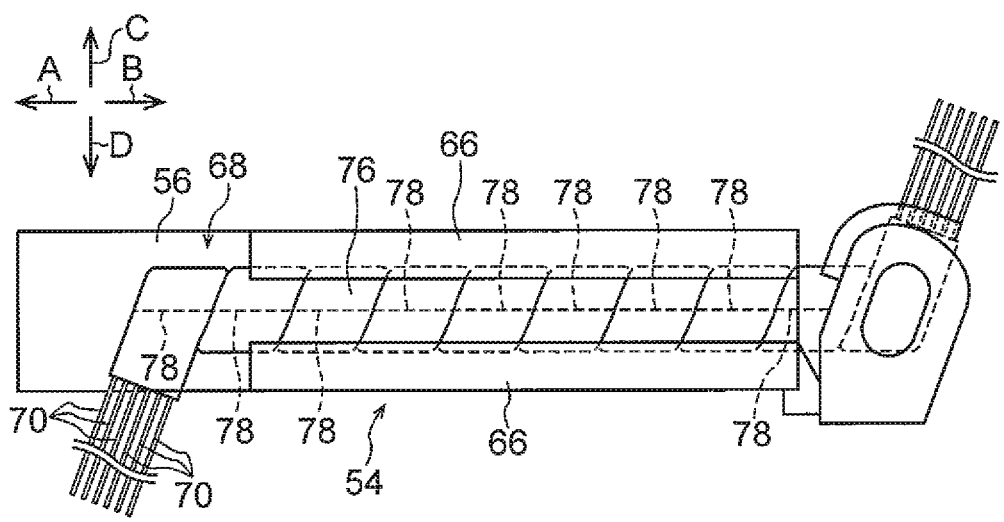
FIG. 8 is a plan view illustrating an appropriately disposed state of a curled cord between outside walls of an inside cover.
Figure 9:
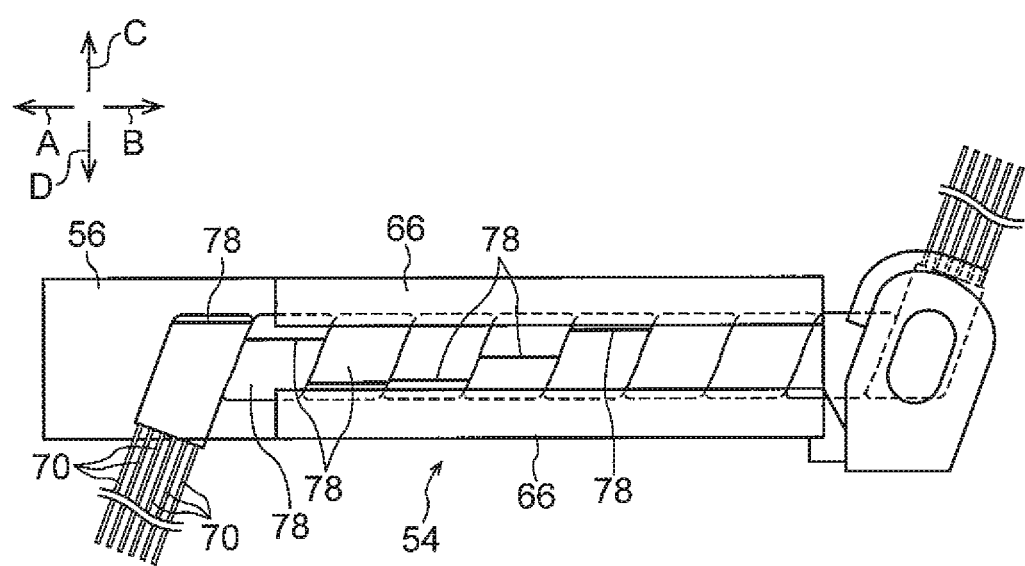
FIG. 9 is a plan view illustrating an example of an inappropriately disposed state of a curled cord between outside walls of an inside cover.

As illustrated in FIG. 8, in a state in which the curled cord 68 is disposed in an appropriate manner between the two outside walls 66 of the inside cover 54, the markings 78 are disposed on the inside cover body 56 side of the inside cover 54. The markings 78 are accordingly not visible from the side of the two outside walls 66 of the inside cover 54 (the arrow C direction side in FIG. 2, etc.). However, if there is incorrect assembly of the curled cord 68 to the inside cover 54, such as the state in which the curled cord 68 is disposed between the two outside walls 66 of the inside cover 54 being a state in which the curled cord 68 is twisted, or at state in which one length direction side of the curled cord 68 and another length direction side of the curled cord 68 are disposed the wrong way round, the marking 78s become visible at the side of the inside cover 54 on the two outside wall 66 side, as illustrated in FIG. 9. This thereby enables easy confirmation of whether or not the curled cord 68 has been disposed in an appropriate manner between the two outside walls 66 of the inside cover 54 by looking at the curled cord 68 from the side of the inside cover 54 on the two outside walls 66 side, in a state in which the curled cord 68 has been disposed between the two outside walls 66 of the inside cover 54.

Moreover, a length direction leading end portion of the covering 76 of the curled cord 68 is retained on one cover width direction side (the arrow C direction side in FIG. 2) of the outside cover 34, either directly by the outside cover 34, or indirectly through a retention member. The six elongated members 70 of the curled cord 68 extend from the length direction leading end of the covering 76 toward the outside of the covering 76. As described above, the length direction leading end portion of the covering 76 of the curled cord 68 is retained on the one cover width direction side of the outside cover 34, either directly by the outside cover 34, or indirectly through a retention member. For example, when the outside cover 34 has been moved in the cover length direction of the outside cover 34 (the arrow A direction or the arrow B direction in FIG. 1 and FIG. 2) with respect to the inside cover 54, the length direction leading end portion of the covering 76 of the curled cord 68 is moved together with the outside cover 34. This enables load to be suppressed from acting on a portion of the elongated members 70 extending from the length direction leading end portion of the covering 76 even when the outside cover 34 has been moved.

Figure 3:
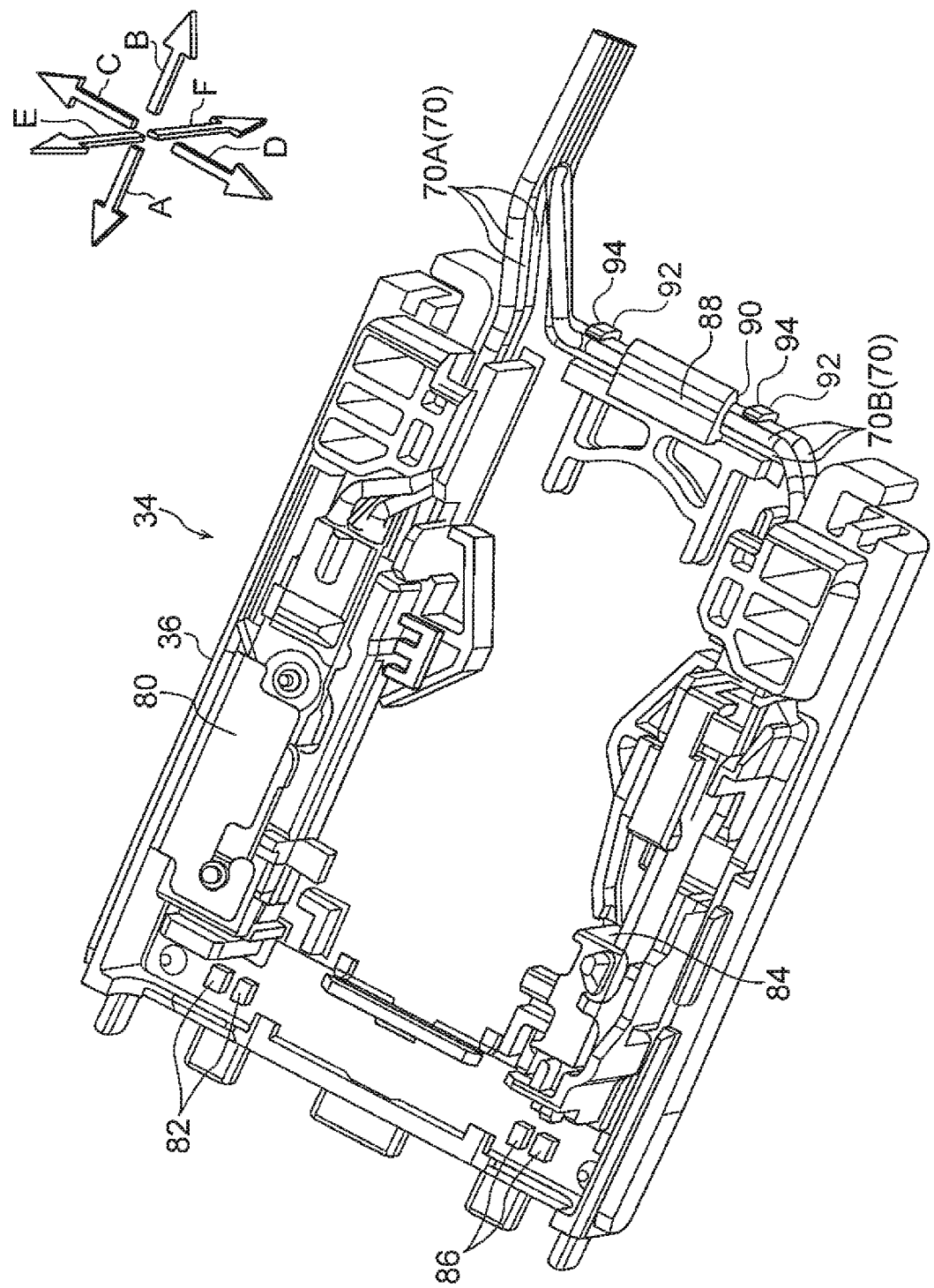
FIG. 3 is a perspective view of a first member of an outside cover.

On the other hand, as illustrated in FIG. 3, three elongated members 70A out of the six elongated members 70 extend toward the one cover length direction side (the arrow A direction side in FIG. 3) on the one cover width direction side (the arrow C direction side in FIG. 3) inside the outside cover 34. Length direction leading end portions of the elongated members 70A are mechanically and electrically connected to a first cord side connector, and the first cord side connector is mechanically and electrically connected to a first cover side connector. The first cover side connector is provided to the first member 36 disposed inside the outside cover 34 on the one cover width direction side.

Corresponding thereto, a first switch 80 is provided to the first member 36 configuring the outside cover 34. The first switch 80 is disposed inside the outside cover 34, so as to be disposed further toward the one cover width direction side (the arrow C direction side in FIG. 3) than the buckle body 44. The first switch 80 is configured including a magnetic sensor such as a Hall sensor or a magnetic resistor element, and including a magnetic body coupled to movement of the tongue 50 when it has been inserted inside the buckle body 44. The first switch 80 is mechanically and electrically connected to the first cover side connector described above, and is electrically connected to the ECU through the first cover side connector, the first cord side connector, and the elongated members 70A.

A first tongue detection signal, this being an electrical signal, is output from the magnetic sensor of the first switch 80. The first tongue detection signal is input to the ECU, serving as a control unit, through the elongated members 70A. When the first tongue detection signal is input to the ECU as the tongue 50 has been inserted inside the buckle body 44, an airbag device installed to the vehicle is placed by the ECU in an operable state, rendering the airbag device operable in the event of, for example, a vehicle emergency such as a vehicle collision.

Moreover, the first member 36 configuring the outside cover 34 is provided with first LEDs 82, serving as a light emitting unit. The first LEDs 82 are disposed at an end portion on the one cover length direction side (the arrow A direction side in FIG. 3) of the outside cover 34 at the one cover width direction side (the arrow C direction side in FIG. 3) of the outside cover 34. The first LEDs 82 are mechanically and electrically connected to the first cover side connector described above, and the first LEDs 82 emit light as a result of current flowing in the first LEDs 82 in a voltage-applied state exceeding a specific magnitude.

Figure 5:
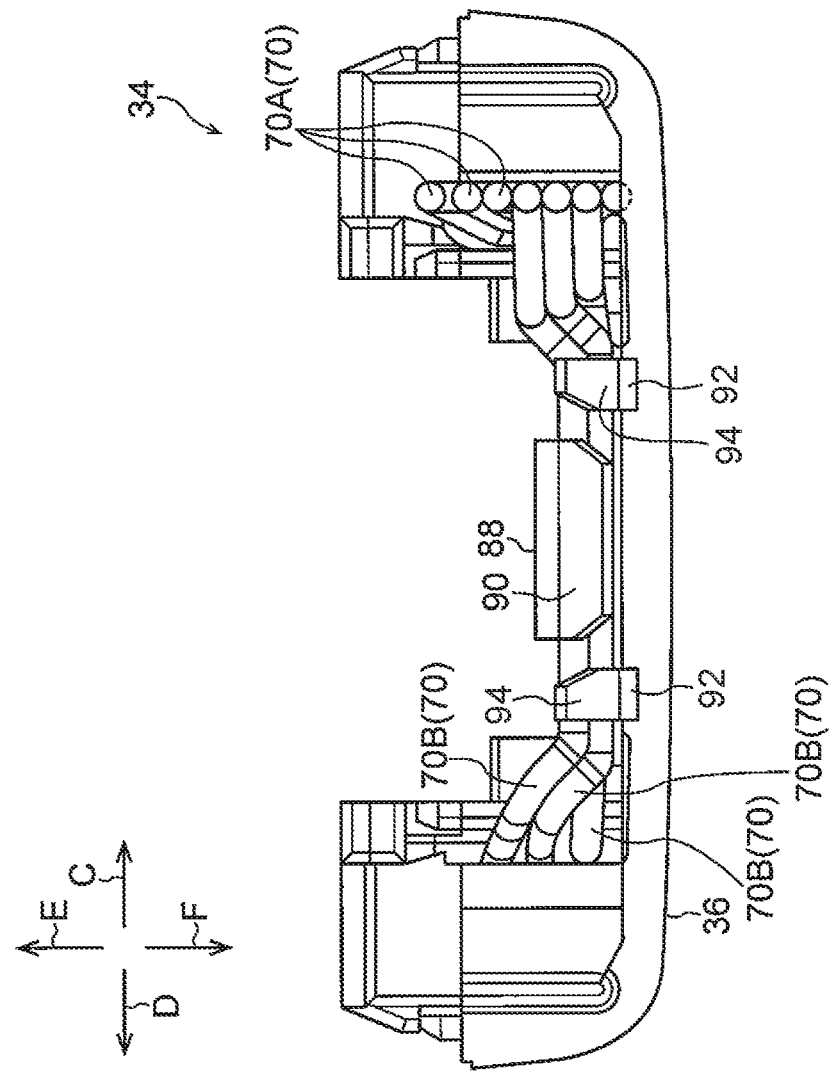
FIG. 5 is a back view of a first member of an outside cover as seen from another cover length direction side.

On the other hand, as illustrated in FIG. 3 and FIG. 5, out of the six elongated members 70 extending from the length direction leading end of the covering 76 of the curled cord 68, the three elongated members 70B that extend toward the one cover length direction side of the outside cover 34 other than the elongated members 70A at the one cover width direction side of the outside cover 34, are disposed from the one cover width direction side of the outside cover 34 (the arrow C direction side in FIG. 3 and FIG. 5) so as to pass by at the another cover thickness direction side (the arrow F direction side in FIG. 3 and FIG. 5) of the placement position of the joint anchor 52 of the buckle 42, to extend toward the another cover width direction side (the arrow D direction side in FIG. 3 and FIG. 5) of the outside cover 34, and to run along an end portion at the another cover length direction side (the arrow B direction side in FIG. 3) of the first member 36 of the outside cover 34. Moreover, as illustrated in FIG. 3, the elongated members 70B extend from an end portion the another cover width direction side (the arrow D direction side in FIG. 3 and FIG. 5) on the another cover length direction side (the arrow B direction side in FIG. 3) of the first member 36 toward the one cover length direction side (the arrow A direction side in FIG. 3 and FIG. 5).

Length direction leading end portions of the elongated members 70B are mechanically and electrically connected to a second cord side connector, and the second cord side connector is mechanically and electrically connected to a second cover side connector. The second cover side connector is provided inside the outside cover 34 to the first member 36 configuring the outside cover 34 at the another cover width direction side (the arrow D direction side in FIG. 3).

The first member 36 configuring the outside cover 34 is also provided with a second switch 84. The second switch 84 is disposed inside the outside cover 34, further to the another cover width direction side (the arrow D direction side in FIG. 3) than the placement position of the buckle body 44. The second switch 84 is configured by a mechanical contact switch including a fixed contact and a movable contact, and the movable contact of the second switch 84 is coupled to movement of the tongue 50 when it has been inserted inside the buckle body 44. The second switch 84 is mechanically and electrically connected to the second cover side connector described above, and is electrically connected to the ECU through the second cover side connector, the second cord side connector, and the elongated members 70B.

A magnetic sensor of the second switch 84 outputs a second tongue detection signal, this being an electrical signal. The second tongue detection signal is input to the ECU, serving as a control unit, through the elongated members 70B. For example, when the second tongue detection signal is input to the ECU when the tongue 50 has been inserted inside the buckle body 44, a warning light provided to a vehicle instrument panel of a vehicle is turned off.

The first member 36 configuring the outside cover 34 is provided with second LEDs 86, serving as a light emitting unit. The second LEDs 86 are disposed at an end portion at the one cover length direction side (the arrow A direction side in FIG. 3) on the another cover width direction side (the arrow D direction side in FIG. 3) of the outside cover 34. The second switch 84 is mechanically and electrically connected to the second cover side connector described above, and the second LEDs 86 emit light as a result of current flowing in the second switch 84 in a voltage-applied state exceeding a specific magnitude.

Figure 4:
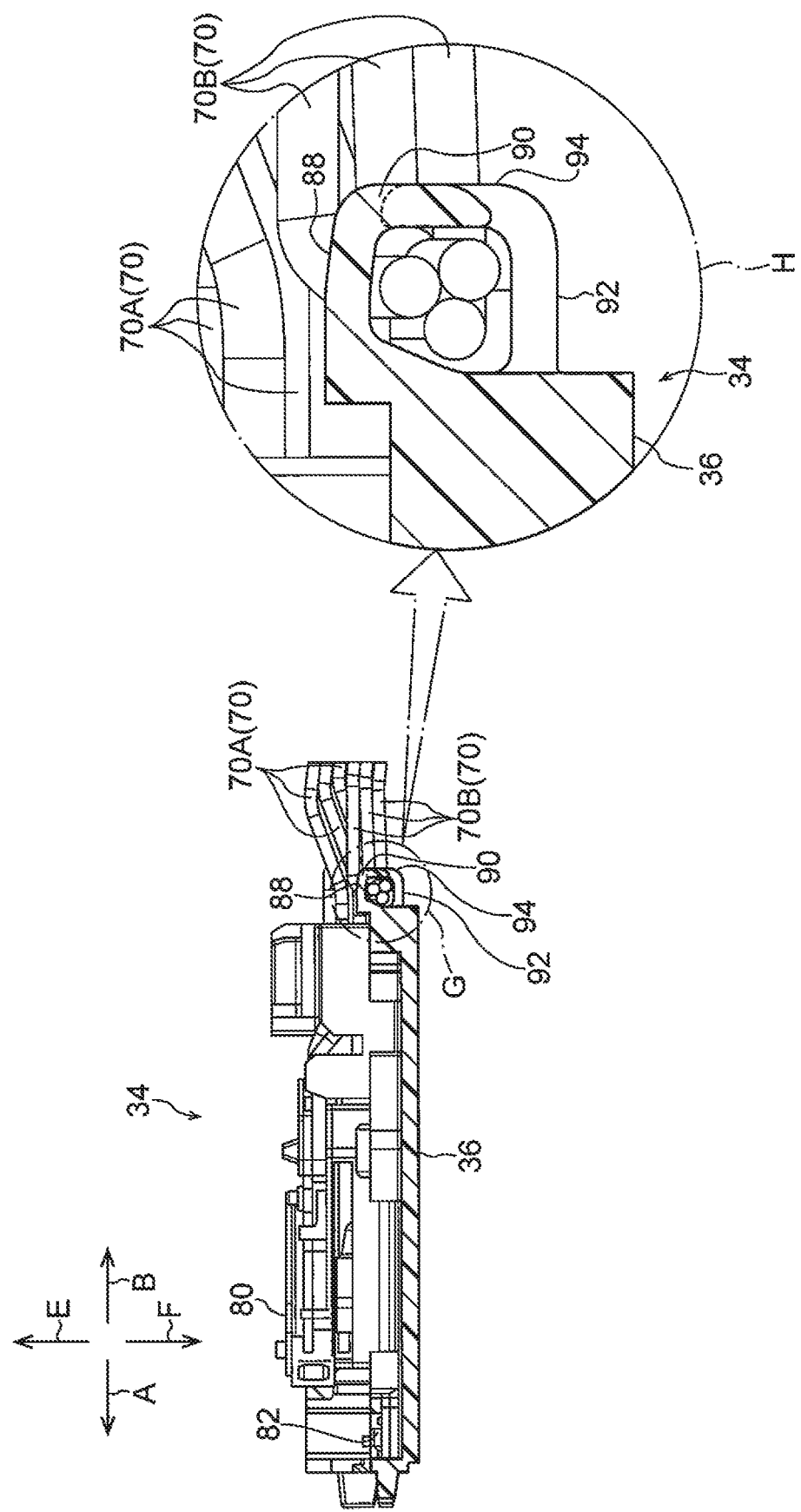
FIG. 4 is a side view cross-section of a first member of an outside cover as seen from another cover width direction side, in which the single-dotted dashed line circle H is an enlarged view of the portion enclosed by the single-dotted dashed line circle G.

As illustrated in each of FIG. 3 to FIG. 5, a first retention portion 88, serving as a retention section, is provided to the first member 36 of the outside cover 34. The first retention portion 88 extends toward the another cover length direction side from approximately the cover width direction (the arrow C direction and arrow D direction in FIG. 3, etc.) center at an end portion at the another cover length direction side (the arrow B direction side in FIG. 3 etc.) of the first member 36. A first removal-suppression portion 90, serving as a retention section, is provided at an end portion on the another cover length direction side of the first retention portion 88.

The first removal-suppression portion 90 extends from the another cover length direction side (the arrow B direction side in FIG. 3 etc.) of the first retention portion 88 toward the another cover thickness direction side (the arrow F direction side in FIG. 3 etc.). Accordingly, overall the first retention portion 88 and the first removal-suppression portion 90 have an hooked shape bending toward the another cover thickness direction side. A dimension in a width direction (the arrow C direction and arrow D direction in FIG. 3 etc.) of the first removal-suppression portion 90 that runs in the cover width direction becomes smaller on progression toward the another cover thickness direction side, such that both width direction ends of the first removal-suppression portion 90 migrate toward the width direction center on progression toward the another thickness direction side of the outside cover 34.

Second retention portions 92, serving as a retention section, are provided at the two cover width direction sides (the arrow C direction side and arrow D direction side in FIG. 3 etc.) of the first retention portion 88 formed to the first member 36 of the outside cover 34. The second retention portions 92 extend toward the another cover length direction side from a portion of the first member 36 further to the another cover thickness direction side (the arrow F direction side in FIG. 3 etc.) than the first retention portion 88 at the another cover length direction side (the arrow B direction side in FIG. 3 etc.) of the first member 36. A second removal-suppression portion 94, serving as a retention section, is provided to the end portion at the another cover length direction side of each of the second retention portions 92.

Each of the second removal-suppression portions 94 extends from the end portion at the another cover length direction side (the arrow B direction side in FIG. 3 etc.) of the second retention portion 92 toward the one cover thickness direction side (the arrow E direction side in FIG. 3 etc.). Accordingly, overall the second retention portions 92 and the second removal-suppression portions 94 have a hooked shape bent toward the one cover thickness direction side. Moreover, a dimension of each second removal-suppression portion 94 in its width direction (the arrow C direction and arrow D direction in FIG. 3 etc.) that runs along the cover width direction (the arrow C direction and arrow D direction in FIG. 3 etc.) becomes smaller on progression toward the one cover thickness direction side (the arrow E direction side in FIG. 3 etc.), such that the another width direction end of the second removal-suppression portion 94 on the one cover width direction side migrates toward the width direction center on progression toward the another cover thickness direction side, and the one width direction end of the second removal-suppression portion 94 on the another cover width direction side is migrates toward the width direction center on progression toward the another cover thickness direction side.

As illustrated in FIG. 5, the one width direction end (the arrow C direction side end portion in FIG. 5 etc.) of the first removal-suppression portion 90 and the another width direction end of the second removal-suppression portion 94 on the one cover width direction side of the first member 36 of the outside cover 34 (the arrow D direction side end portion in FIG. 5 etc.) are substantially parallel to one another, a gap between both ends is set to the diameter dimension of the elongated members 70B or greater.

The another width direction end (the arrow D direction side end portion in FIG. 5 etc.) of the first removal-suppression portion 90 and the one width direction end (the arrow C direction side end portion in FIG. 5 etc.) of the second removal-suppression portion 94 on the another cover width direction side of the first member 36 are substantially parallel to one another, a gap between both ends is set to the diameter dimension of the elongated members 70B or greater.

Figure 6:
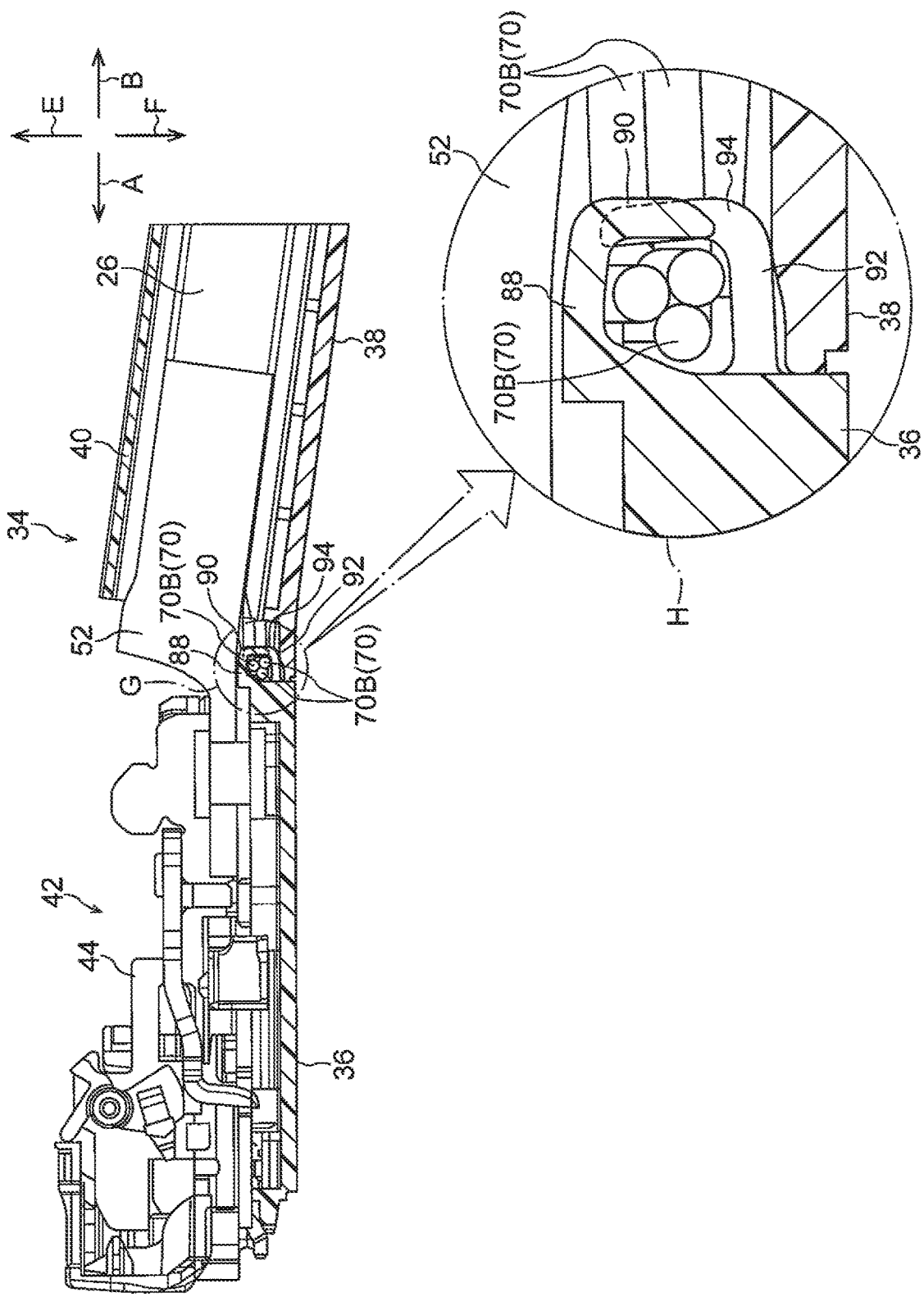
FIG. 6 is a side view cross-section corresponding to FIG. 4, illustrating a state in which a second member and a buckle have been assembled to a first member of an outside cover, in which the single-dotted dashed line circle H is an enlarged view of the portion enclosed by the single-dotted dashed line circle G.

As illustrated in FIG. 6, in a state in which the second member 38 configuring the outside cover 34 is assembled to the first member 36, an end portion at the one length direction side (the arrow A direction side end portion in FIG. 6) of the second member 38 of the outside cover 34 is disposed on the another thickness direction side (the arrow F direction side in FIG. 6) of the outside cover 34 at the second retention portions 92. Accordingly, the second retention portions 92 are deformed so as to swing toward the one thickness direction side of the outside cover 34 (the arrow E direction side in FIG. 6) about end portions of the second retention portions 92 at the end portion at the one length direction side of the outside cover 34. A separation between the one width direction end of the first removal-suppression portion 90 and the another width direction end of the second removal-suppression portion 94 on the one width direction side of the first member 36 is accordingly small, and a separation between the another width direction end of the first removal-suppression portion 90 and the another width direction end of the second removal-suppression portion 94 on the another width direction side of the first member 36 is small.

As illustrated in FIG. 4, at the first member 36 of the outside cover 34, a portion of the elongated members 70B extending from the length direction leading end of the covering 76 of the curled cord 68 that is a portion disposed along the end portion at the another length direction side (the arrow B direction side in FIG. 4 etc.) of the outside cover 34 of the first member 36, is disposed between the first retention portion 88 and the second retention portions 92 in the thickness direction (the arrow E direction and arrow F direction in FIG. 4 etc.) of the outside cover 34. Accordingly, displacement of the elongated members 70B toward the thickness direction sides of the outside cover 34 is suppressed by the first retention portion 88 and the second retention portions 92.

Moreover, the first removal-suppression portion 90 and the second removal-suppression portion 94 are disposed at the another length direction side (the arrow B direction side in FIG. 4) of the outside cover 34 with respect to the portion of the elongated members 70B disposed between the first retention portion 88 and the second retention portions 92. Accordingly, displacement of the elongated members 70B toward the another length direction side of the outside cover 34 is suppressed by the first removal-suppression portion 90 and the second removal-suppression portion 94.

In the buckle device 10, for example, when a vehicle door corresponding to the seat 14 applied with the buckle device 10 changes from a closed state to an open state, the change in the open/closed state of the door is detected by a detection unit such as a door opening/closing detection sensor of a courtesy switch or the like. Moreover, for example, when an occupant 96 sits in the seat 14, the occupant 96 is detected as sitting in the seat 14 by a detection section such as an occupant detection unit of a load sensor provided to the seat 14 or the like.

The level changes in an electronic signal output from the detection unit to the ECU, serving as a control unit, when there is a change in the state of the door or state of the seat 14 accompanying an occupant getting into the vehicle. Accordingly, the motor of the motor actuator 22 is driven to rotate the drive screw 20, such that the slider 24 slides toward the vehicle rear side guided by the two guide walls 18 of the frame 16. Accordingly, when the wire rope 26 moves toward its length direction leading end side, the buckle body 44 is pushed diagonally toward the vehicle front upper side by the wire rope 26.

Pressing force from the wire rope 26 is transmitted to the outside cover 34 through the buckle body 44, such that the outside cover 34 moves diagonally toward the vehicle front upper side (the arrow A direction side in FIG. 1 and FIG. 2) together with the buckle body 44, guided by the inside cover 54 (the state illustrated in FIG. 2). Moving the outside cover 34 in this manner enables the occupant 96 to easily engage the tongue 50 with the buckle 42, thereby facilitating wearing of the webbing 48.

Corresponding thereto, when the tongue 50 is engaged with the buckle 42, the level changes in the electronic signal output from a buckle switch of the buckle 42 to the ECU, serving as a control unit. The motor actuator 22 is accordingly driven so as to rotate the drive screw 20, such that the slider 24 slides toward the vehicle front side guided by the two guide walls 18 of the frame 16. Accordingly, when the wire rope 26 moves toward its length direction base end side, the outside cover 34 is pulled by the wire rope 26 through the buckle body 44. The outside cover 34 is thereby guided by the inside cover body 56, such that the outside cover 34 is moved diagonally toward the vehicle rear lower side (the arrow B direction in FIG. 1 and FIG. 2), thus returning the buckle 42 to a predetermined position (the state illustrated in FIG. 1).

Note that in the buckle device 10, in an outside cover assembly process in the process to assemble the buckle device 10, the first member 36, the second member 38, the third member 39, and the fourth member 40 are assembled together to form the outside cover 34. A wire connection process and an elongated member engagement process are performed prior to this outside cover assembly process.

In the wire connection process, prior to assembling the second member 38, the third member 39, and the fourth member 40 etc. together, the first cord side connector connected to the leading end portions of the elongated members 70A of the curled cord 68 is connected to the first cover side connector provided to the first member 36, and the second cord side connector connected to the leading end portions of the elongated members 70B of the curled cord 68 is connected to the second cover side connector provided to the first member 36.

The elongated member engagement process is performed either before or after the wire connection process. In the elongated member engagement process, out of the elongated members 70B extending from the length direction leading end portion of the covering 76 of the curled cord 68, the portion of the elongated members 70B disposed along the end portion at the another cover length direction side (the arrow B direction side in FIG. 3 etc.) of the first member 36 configuring the outside cover 34 is disposed on the one cover thickness direction side (the arrow E direction side in FIG. 5 etc.) of the two second retention portions 92 of the first member 36, and is also disposed on the another cover thickness direction side (the arrow F direction side in FIG. 5 etc.) of the first retention portion 88 of the first member 36.

Moreover, out of the elongated members 70B, a portion of the elongated members 70B between the first retention portion 88 of the first member 36 and the second retention portion 92 on the one cover width direction side (the arrow C direction side in FIG. 5 etc.) is passed between the one width direction end (the arrow C direction side end portion in FIG. 5 etc.) of the first removal-suppression portion 90 of the first member 36, and the another width direction end (the arrow D direction side end portion in FIG. 5 etc.) of the second removal-suppression portion 94 on the one cover width direction side. Moreover, out of the elongated members 70B, a portion of the elongated members 70B between the first retention portion 88 of the first member 36 and the second retention portion 92 on the another cover width direction side (the arrow D direction side in FIG. 5 etc.) is passed between the another width direction end (the arrow D direction side end portion in FIG. 5 etc.) of the first removal-suppression portion 90 of the first member 36 and the one width direction end (the arrow C direction side end portion in FIG. 5 etc.) of the second removal-suppression portion 94 on the another cover width direction side.

In this state, the elongated members 70B are smoothed out along the length direction of the portion disposed along the end portion at the another cover length direction side (the arrow B direction side in FIG. 3 etc.) of the elongated members 70B in order to remove slack. When this is performed, the elongated members 70B face the first retention portion 88 on the one cover thickness direction side (the arrow E direction side in FIG. 5 etc.), and face the second retention portions 92 on the another cover thickness direction side (the arrow F direction side in FIG. 5 etc.). Moreover, the elongated members 70B face an end portion at the another cover length direction side (the arrow B direction side in FIG. 4 etc.) of the first member 36 configuring the outside cover 34 at the one cover length direction side (the arrow A direction side in FIG. 4 etc.), and face the first removal-suppression portion 90 and the second removal-suppression portion 94 on the another cover length direction side.

The portion of the elongated members 70B disposed along the end portion at the another cover length direction side (the arrow B direction side in FIG. 3 etc.) of the first member 36 is thus suppressed from being displaced in directions orthogonal to the length direction of this portion of the elongated members 70B, and the position of the portion of the elongated members 70B disposed along the another cover length direction side of the first member 36 is stabilized. The elongated members 70B are, accordingly, suppressed from, for example becoming trapped between the first member 36 and the second member 38 when assembling the first member 36, the second member 38, the third member 39, and the fourth member 40 configuring the outside cover 34 together in the outside cover assembly process. A reduction in the ease of operation of the outside cover assembly process resulting from trapping the elongated members 70B between the first member 36 and the second member 38 can accordingly be suppressed.

Moreover, one of the second retention portions 92 is provided offset to the one cover width direction side (the arrow C direction side in FIG. 5 etc.) with respect to the first retention portion 88, and the other of the second retention portions 92 is provided offset to the another cover width direction side (the arrow D direction side in FIG. 5 etc.) with respect to the first retention portion 88. A range in which displacement of the elongated members 70B in a direction orthogonal to the length direction of the elongated members 70B is suppressed by the first retention portion 88, the first removal-suppression portion 90, the second retention portions 92, and the second removal-suppression portions 94 can accordingly be made large along the length direction of the elongated members 70B.

Moreover, one of the second removal-suppression portions 94 is provided offset to the one cover width direction side (the arrow C direction side in FIG. 5 etc.) with respect to the first removal-suppression portion 90, and the other of the second removal-suppression portions 94 is provided offset to the another cover width direction side (the arrow D direction side in FIG. 5 etc.) with respect to the first removal-suppression portion 90. The first removal-suppression portion 90 and the second removal-suppression portions 94 therefore do not impinge on one another. Accordingly, the first removal-suppression portion 90 can be greatly extended toward the another cover thickness direction side, and the second removal-suppression portions 94 can be greatly extended toward the one cover thickness direction side. This thereby enables displacement of the elongated members 70B toward the another cover length direction side (the arrow B direction side in FIG. 4 etc.) to be effectively suppressed.

Moreover, in a state in which the second member 38 has been assembled to the first member 36 configuring the outside cover 34, an end portion at the one cover length direction side (the arrow A direction side in FIG. 6 etc.) of the second member 38 is disposed on the another cover thickness direction side (the arrow F direction side in FIG. 6 etc.) of the second retention portions 92. The second retention portions 92 are thereby deformed so as to swing toward the one cover thickness direction side (the arrow E direction side in FIG. 6 etc.) about the end portion at the one cover length direction side of the second retention portions 92.

Accordingly, a separation between the one width direction end of the first removal-suppression portion 90 and the another width direction end of the second removal-suppression portion 94 on the one width direction side of the first member 36, and a separation between the another width direction end of the first removal-suppression portion 90 and the one width direction end of the second removal-suppression portion 94 on the another width direction side of the first member 36 are made smaller. This thereby enables the elongated members 70B to be even more effectively suppressed from coming out from between the first retention portion 88 and the second retention portions 92, thus enabling the position of the portion of the elongated members 70B disposed along the end portion at the another cover length direction side (the arrow B direction side in FIG. 3 etc.) of the first member 36 in an assembled state of the outside cover 34 to be effectively stabilized.

Moreover, the outside cover 34 and the inside cover 54 are assembled together in the cover assembly process. Note that as described above, the portion of the elongated members 70B disposed along the end portion at the another cover length direction side (the arrow B direction side in FIG. 3 etc.) is suppressed from being displaced in directions orthogonal to the length direction of this portion of the elongated members 70B by the first retention portion 88, the second retention portions 92, the first removal-suppression portion 90, the second removal-suppression portions 94, and the end portion at the another cover length direction side (the arrow B direction side in FIG. 3 etc.) of the first member 36, such that the position of the portion of the elongated members 70B disposed along the end portion at the another cover length direction side of the first member 36 is stabilized.

This thereby enables the portion of the elongated members 70B disposed along the end portion at the another cover length direction side of the first member 36 to be suppressed from becoming trapped between the outside cover 34 and the inside cover 54 when the outside cover 34 and the inside cover 54 are being assembled together in the cover assembly process. This thereby enables a decrease in the ease of operation of the cover assembly process resulting from the elongated members 70B becoming trapped between the outside cover 34 and the inside cover 54 to be suppressed.

Moreover, as described above, in the buckle device 10, the outside cover 34 is moved in the length direction (the arrow A direction and arrow B direction in FIG. 1 and FIG. 2) with respect to the inside cover 54 by the drive force of the motor of the motor actuator 22. The portion of the elongated members 70B disposed along the end portion at the another cover length direction side (the arrow B direction side in FIG. 3 etc.) of the first member 36 is suppressed from being displaced in directions orthogonal to the length direction of this portion of the elongated members 70B by the first retention portion 88, the second retention portions 92, the first removal-suppression portion 90, the second removal-suppression portions 94, and the end portion at the another cover length direction side of the first member 36, thereby stabilizing the position of the portion of the elongated members 70B disposed along the end portion at the another cover length direction side of the first member 36.

This thereby enables the portion of the elongated members 70B disposed along the end portion at the another cover length direction side (the arrow B direction side in FIG. 3 etc.) of the first member 36 to be suppressed from becoming trapped between the outside cover 34 and the inside cover 54 when moving the outside cover 34 with respect to the inside cover 54. This thereby enables movement of the outside cover 34 with respect to the inside cover 54 to be made smooth, thereby enabling the operation characteristics of the buckle device 10 to be stabilized.

Moreover, the portion of the elongated members 70B disposed along the end portion at the another cover length direction side (the arrow B direction side in FIG. 3) of the first member 36 is disposed at the another cover thickness direction side (the arrow F direction side in FIG. 6 etc.) of the joint anchor 52 of the buckle 42. The portion of the elongated members 70B disposed along the end portion at the another cover length direction side (the arrow B direction side in FIG. 6) of the first member 36 is suppressed from being displaced in directions orthogonal to the length direction by the first retention portion 88, the second retention portions 92, the first removal-suppression portion 90, the second removal-suppression portions 94, and the end portion at the another cover length direction side of the first member 36, thereby stabilizing the position of the portion of the elongated members 70B disposed along the end portion at the another cover length direction side of the first member 36. This thereby enables the portion of the elongated members 70B disposed along the end portion at the another cover length direction side of the first member 36 to be suppressed from abutting the joint anchor 52 that is formed from a metal such as steel.

Note that in the exemplary embodiment described above, configuration is made in which the outside cover 34 serving as a moving member is formed by assembling together the first member 36, the second member 38, the third member 39, and the fourth member 40. However, configuration may be made in which the moving member is configured by a single, integrally formed component rather than a configuration in which the moving member is formed by assembling together plural members, as long as the moving member has a configuration capable of moving while being guided by the guide member.

Moreover, in the exemplary embodiment described above, the outside cover 34 serving as a cover member is configured so as to be capable of moving while being guided by the inside cover 54. However, the cover member may, for example, be configured so as to be moved by drive force from a drive unit such as a motor as long as the cover member has a configuration formed by assembling together plural members configured including a first member and a second member.

Moreover, in the exemplary embodiment described above, configuration is made in which the outside cover 34 serves as a moving member and the inside cover 54 disposed inside the outside cover 34 serves as a guide member. However, configuration may be made in which an inside moving member is moved guided by an outside guide member using drive force of a drive unit such as a motor.

Moreover, in the exemplary embodiment described above, configuration is made in which the first retention portion 88, the second retention portions 92, the first removal-suppression portion 90, and the second removal-suppression portion 94 serving as a retention section are provided to the end portion at the another cover length direction side (the arrow B direction side in FIG. 3) of the first member 36 configuring the outside cover 34 serving as a cover member and a moving member. However, the position to which the retention section is provided is not limited to such a position. For example, configuration may be made in which the retention section is provided to an end portion at the cover width direction side (the arrow C direction side or arrow D direction side in FIG. 3) inside the outside cover 34.

Moreover, in the exemplary embodiment described above, the elongated members 70 are configured including electrical wires. However, the elongated members 70 may, for example, be flexible metal wires or may be thread shaped members formed from a synthetic resin.

Explanation has been given regarding an example of the present disclosure. However, the present disclosure is not limited to the above, and obviously various other modifications may be implemented within a scope not departing from the spirit of the present disclosure.

What is claimed is:

1. A buckle device comprising:
   a buckle that is configured to engage with a tongue of a seatbelt device;
   a cover member that includes a first member and a second member for assembly together in tandem and aligned in a longitudinal direction thereof, with an elongated member interposed therebetween, and at which the buckle is provided;
   the elongated member is being anchored to the first member at a length direction leading end portion of the elongated member; and
   a retention section that is provided at the first member, and that is configured to engage a portion of the elongated member that is further toward a length direction base end side of the elongated member than the length direction leading end portion.

2. The buckle device of claim 1, wherein, in a case of retaining the elongated member, the retention section is configured to be elastically deformed, an elastic deformation of the retention section being suppressed by the second member in a state in which the first member and the second member are assembled together.

3. The buckle device of claim 1, wherein the length direction base end side of the elongated member is configured to extend from a first member side to a second member side, and the retention section is provided at an end portion on the second member side of the first member in a state in which the first member and the second member are assembled together.

4. The buckle device of claim 1, wherein the retention section includes:
   a first retention portion that is configured to be engaged with the elongated member from one side in a direction intersecting a length direction of the elongated member and to suppress displacement of the elongated member toward the one side; and
   a second retention portion that is offset toward a length direction side of the elongated member with respect to the first retention portion, and that is configured to be engaged with the elongated member from another side in the direction intersecting the length direction of the elongated member and to suppress displacement of the elongated member toward the other side.

5. The buckle device of claim 1, wherein the retention section includes:
   a first retention portion that is configured to be engaged with the elongated member from one side in a direction intersecting a length direction of the elongated member and to suppress displacement of the elongated member toward the one side;
   a second retention portion that is configured to be engaged with the elongated member from another side in the direction intersecting the length direction of the elongated member and to suppress displacement of the elongated member toward the other side;
   a first removal-suppression portion that is configured to extend from the first retention portion toward the other side in the direction intersecting the length direction of the elongated member and to suppress displacement of the elongated member in a direction in which the elongated member comes out from a gap between the first retention portion and the second retention portion; and
   a second removal-suppression portion that is configured to extend from the second retention portion toward the one side in the direction intersecting the length direction of the elongated member further to a length direction side of the elongated member than the first removal-suppression portion and to suppress displacement of the elongated member in the direction in which the elongated member comes out from the gap between the first retention portion and the second retention portion.

6. The buckle device of claim 5, wherein, in a state in which the first member and the second member have been assembled together, an end portion of the second member on one length direction side of the cover member is disposed at another side of the second retention portion in a thickness direction of the cover member.

7. A buckle device comprising:
   a buckle that is configured to engage with a tongue of a seatbelt device;
   a cover member that includes a first member and a second member for assembly together, and at which the buckle is provided;
   an elongated member that is anchored to the first member at a length direction leading end portion of the elongated member; and
   a retention section that is provided at the first member, and that is configured to engage a portion of the elongated member that is further toward a length direction base end side of the elongated member than the length direction leading end portion, wherein the retention section includes:
     a first retention portion that is configured to be engaged with the elongated member from one side in a direction intersecting a length direction of the elongated member and to suppress displacement of the elongated member toward the one side;
     a second retention portion that is configured to be engaged with the elongated member from another side in the direction intersecting the length direction of the elongated member and to suppress displacement of the elongated member toward the other side;
     a first removal-suppression portion that is configured to extend from the first retention portion toward the other side in the direction intersecting the length direction of the elongated member and to suppress displacement of the elongated member in a direction in which the elongated member comes out from a gap between the first retention portion and the second retention portion; and
     a second removal-suppression portion that is configured to extend from the second retention portion toward the one side in the direction intersecting the length direction of the elongated member further to a length direction side of the elongated member than the first removal-suppression portion and to suppress displacement of the elongated member in the direction in which the elongated member comes out from the gap between the first retention portion and the second retention portion.

* * * * *